(12) United States Patent
Skopal

(10) Patent No.: US 8,350,515 B2
(45) Date of Patent: Jan. 8, 2013

(54) STEPPER MOTOR CONTROLLER WITH BRAKING CIRCUIT

(76) Inventor: Eugene Skopal, Ossining, NY (US)

( * ) Notice: Subject to any disclaimer, the term of this patent is extended or adjusted under 35 U.S.C. 154(b) by 313 days.

(21) Appl. No.: 12/874,223

(22) Filed: Sep. 2, 2010

(65) Prior Publication Data

US 2012/0056573 A1 Mar. 8, 2012

(51) Int. Cl.
*H02P 8/24* (2006.01)

(52) U.S. Cl. .......... 318/696; 318/273; 318/255; 318/685

(58) Field of Classification Search .............. 318/696, 318/273, 255, 685
See application file for complete search history.

(56) References Cited

U.S. PATENT DOCUMENTS 6,139,117 A * 10/2000 Shirai et al. ............... 303/3
7,511,438 B2 * 3/2009 Melfi ........................ 318/87

* cited by examiner

*Primary Examiner* — Walter Benson
*Assistant Examiner* — David Luo
(74) *Attorney, Agent, or Firm* — Oakwood Law Group, LLP; Jie Tan

(57) ABSTRACT

An apparatus for controlling a stepper motor comprises a driver circuit and a brake circuit each having a motor controller device. The driver circuit, brake circuit and motor are connected in parallel. The driver circuit receives an enabling signal and outputs driver current to the motor accordingly. The brake circuit includes a logic circuit which receives the enabling signal, a brake input signal, and a power supply status signal, and outputs a brake logic signal. The brake circuit motor controller device is coupled to the logic circuit. This motor controller device receives an output of the brake logic circuit and outputs braking current to the motor in accordance therewith. The braking circuit is effective to prevent movement of the motor shaft in accordance with output of the braking current. The motor controller devices are substantially identical. The apparatus is effective to control the motor while avoiding generation of RF noise.

10 Claims, 7 Drawing Sheets

| 361 | 201 | 362 | 411 | 210 |
|---|---|---|---|---|
| ENABLE LOGIC | DRIVER CIRCUIT | BRAKE LOGIC | NAND OUTPUT | BRAKE CIRCUIT |
| 0 | ENABLED | 0 | 1 | DISABLED |
| 1 | ENABLED | 0 | 1 | DISABLED |
| 0 | ENABLED | 1 | 1 | DISABLED |
| 1 | DISABLED | 1 | 0 | DISABLED |

441, 442, 443, 444

STEPPER MOTOR CONTROLLER WITH BRAKING CIRCUIT

FIELD OF THE DISCLOSURE

This disclosure relates to electromechanical devices, and more particularly to solid state circuits for controlling stepper motors.

BACKGROUND OF THE DISCLOSURE

Solid state circuits used to control stepper motors switch the direction and intensity of electrically created magnetic fields to step the shaft of the motor into precise positions.

A typical arrangement 100 for controlling a stepper motor 110 is shown in FIG. 1. A motor controller 101 (e.g. A3979 Microstepping Driver from Allegro Microsystems, Inc.) is provided with +24V driver voltage and +5V logic voltage, and receives control signals 105. Controller 101 advantageously includes a translator 102 for managing internal components (e.g. digital-to-analog converters, not shown) so that a pulse delivered to a STEP input causes the motor to be advanced by one increment. As shown in FIG. 1, four outputs of controller 101 are connected to terminals 111-114 respectively at the coils 103, 104 of motor 110. Controller 101 also provides a controller output signal at HOME terminal 108 indicating a home position for the stepper motor. SENSE terminals 106, 107 are connected to sensing circuits indicating current in coils 103, 104 respectively.

In order to increase the speed and torque of motor 110, the current used to create these magnetic fields exceeds the capacity of windings 103, 104 for handling that current. A conventional solid state controller circuit limits this current to safe levels by rapidly switching the current off and on to limit the average current to both safe levels for the motor and appropriate levels based on the desired position of the motor. This rapid switching creates RF noise that can interfere with the operation of other equipment in the vicinity of the stepper motor and its wiring. This is of particular concern when the stepper motor is used to adjust an antenna system.

SUMMARY OF THE DISCLOSURE

The present disclosure provides a stepper motor controller including a braking circuit, where the controller does not need to switch the current off and on to limit the current, and is effective to hold the stepper motor in place without generating RF noise.

In accordance with the disclosure, an apparatus for controlling a motor having a motor shaft comprises a driver circuit and a brake circuit. The driver circuit includes a first motor controller device, configured to receive an enabling signal and to output driver current to the motor in accordance therewith. The driver circuit also includes a plurality of first output connectors for connecting to the motor. The brake circuit includes a brake logic circuit, configured to receive as inputs the enabling signal, a brake input signal, and a power supply status signal, and to output a brake logic signal. The brake circuit also includes a second motor controller device, coupled to the brake logic circuit. This motor controller device is configured to receive the brake logic signal output by the brake logic circuit and to output braking current to the motor in accordance with the brake logic signal. The brake circuit further includes a plurality of second output connectors for connecting to the motor, and a plurality of resistors in series with the second output connectors, between the second motor controller device and the second output connectors. The driver circuit and the brake circuit are connected in parallel and configured for a parallel connection to the motor. The braking circuit is effective to prevent movement of the motor shaft in accordance with output of the braking current to the motor. The first motor controller device and the second motor controller device are substantially identical.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1:
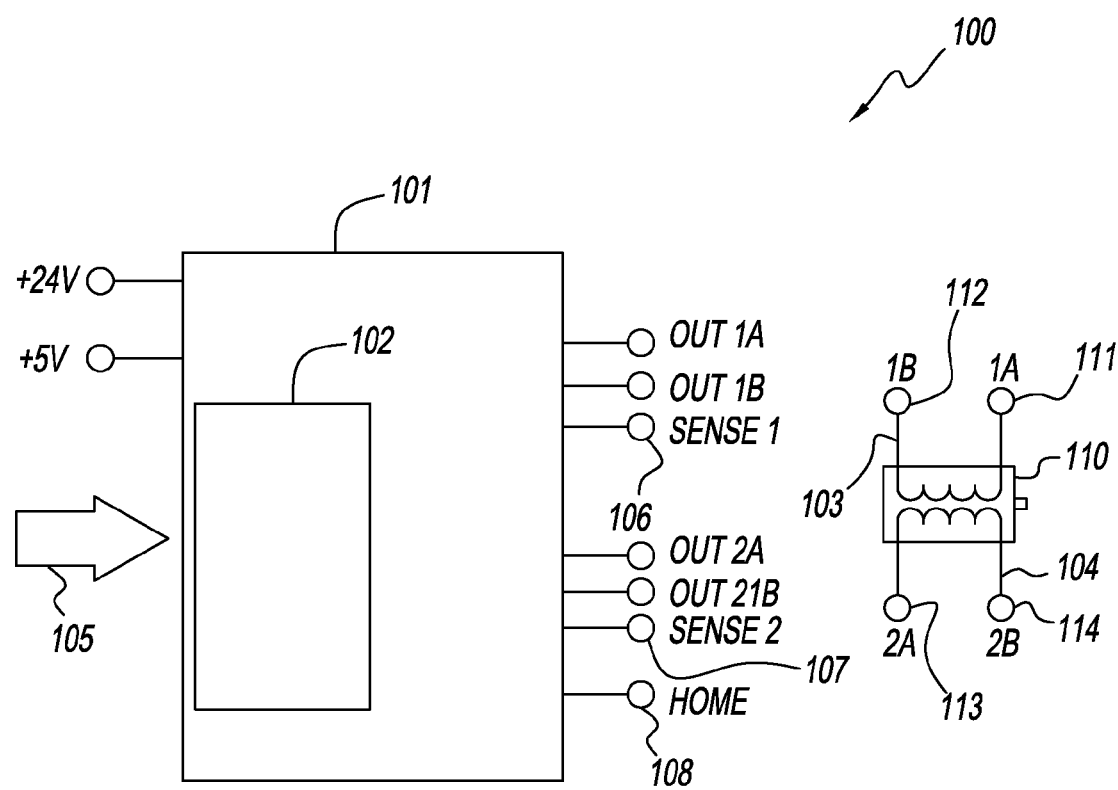
FIG. 1 is a schematic illustration of a typical arrangement of a stepper motor controller and a stepper motor.
Figure 2:
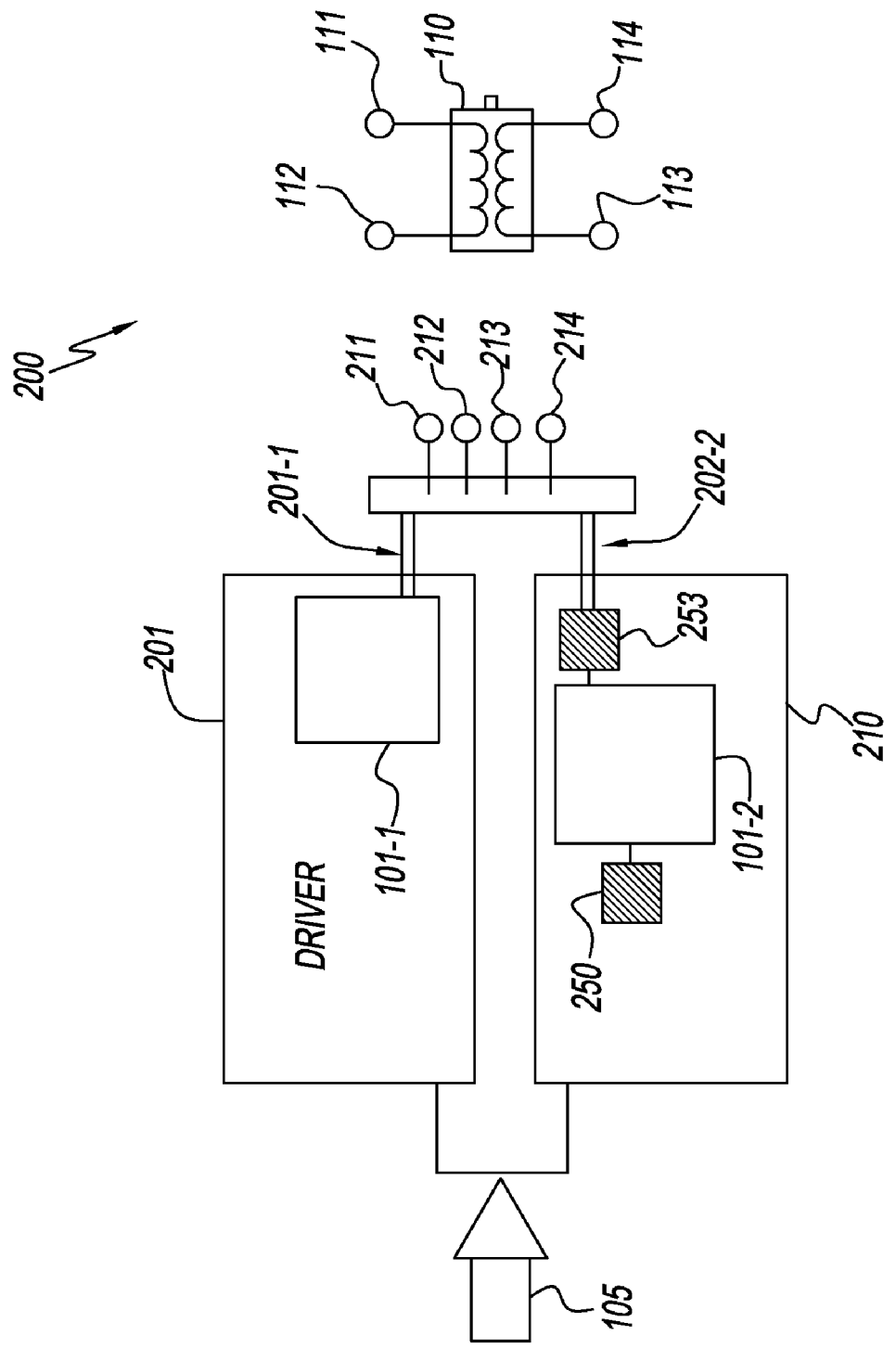
FIG. 2 schematically illustrates a stepper motor controller including a driver circuit and a brake circuit connected in parallel to a stepper motor, in accordance with an embodiment of the disclosure.

A stepper motor and controller arrangement 200 including a controller embodying the disclosure is shown schematically in FIG. 2. Driver circuit 201 and brake circuit 210 are connected in parallel with the input terminals 111-114 of motor 110. Each of these circuits includes a motor controller, as detailed below; driver circuit includes motor controller 101-1 while brake circuit includes motor controller 101-2.

Driver circuit 201 delivers full power to the stepper motor 110 and is used to move the stepper motor. Brake circuit 210 uses a combination of either or both a lower driving voltage and resistors in series with the motor's windings 103, 104 to limit the current so that the circuit never needs to switch the current off and on to limit the current. Brake circuit 210 is used to hold the stepper motor in place without generating RF noise.

Driver circuit 201 in this embodiment is mounted on a mezzanine board that in turn plugs into a mother board. The mother board provides power (at +24V and +5V for driving the motor and logic circuits, respectively) and control signals 105, and routes the output signals to the stepper motor.

In this embodiment, brake circuit 210 is mounted on a mezzanine board that plugs into the driver circuit mezzanine board described above. A shown schematically in FIG. 2, control signals 105 from the mother board are provided to both the driver circuit and the brake circuit. The outputs 202-1 and 202-2 of both driver circuit 201 and brake circuit 210 are connected in parallel to terminals 211-214 for connecting to terminals 111-114 respectively at the coils of motor 110.

Figure 5:
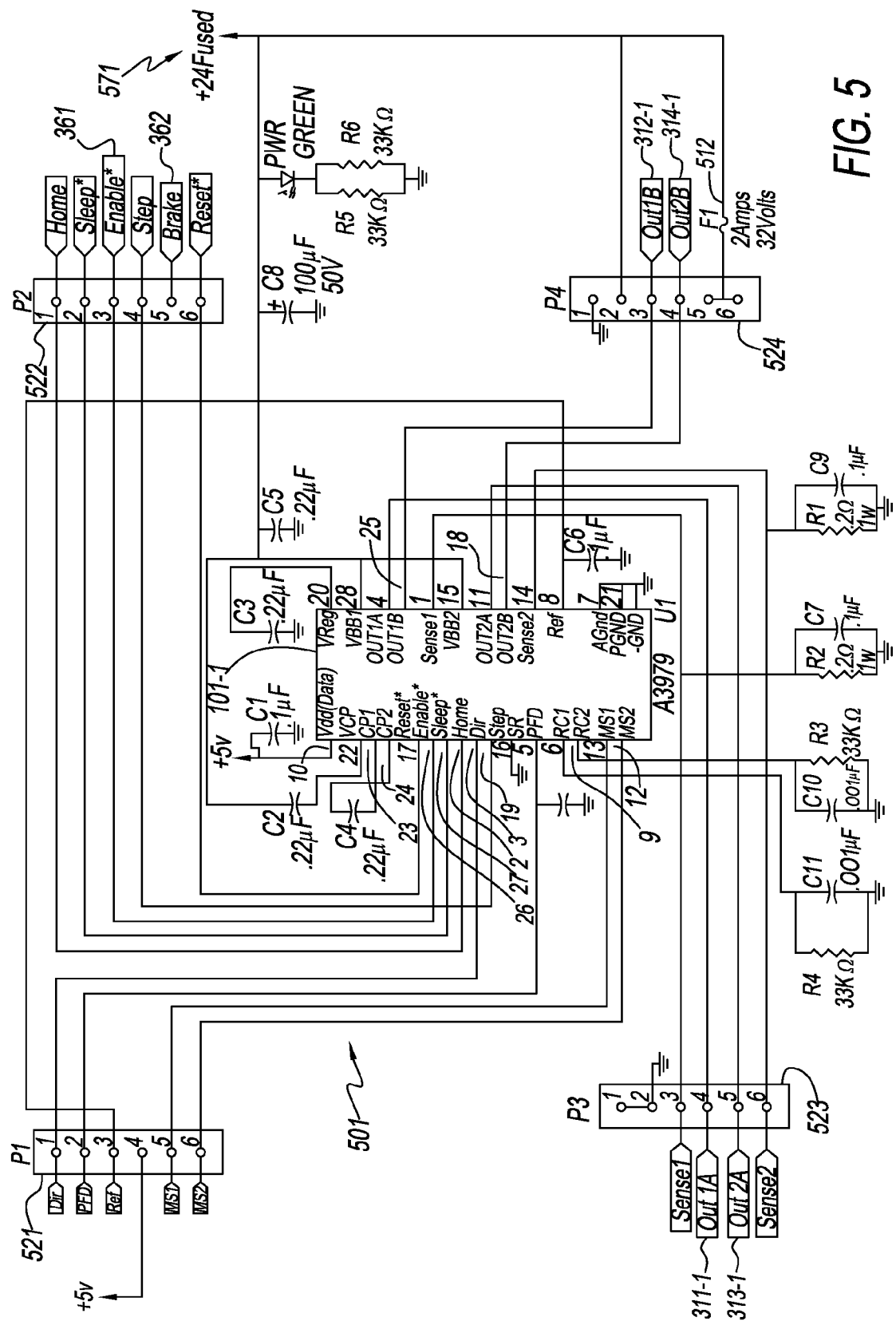
FIG. 5 is a circuit diagram showing how the driver circuit of FIGS. 2 and 3 may be realized, in accordance with an embodiment of the disclosure.
Figure 6:
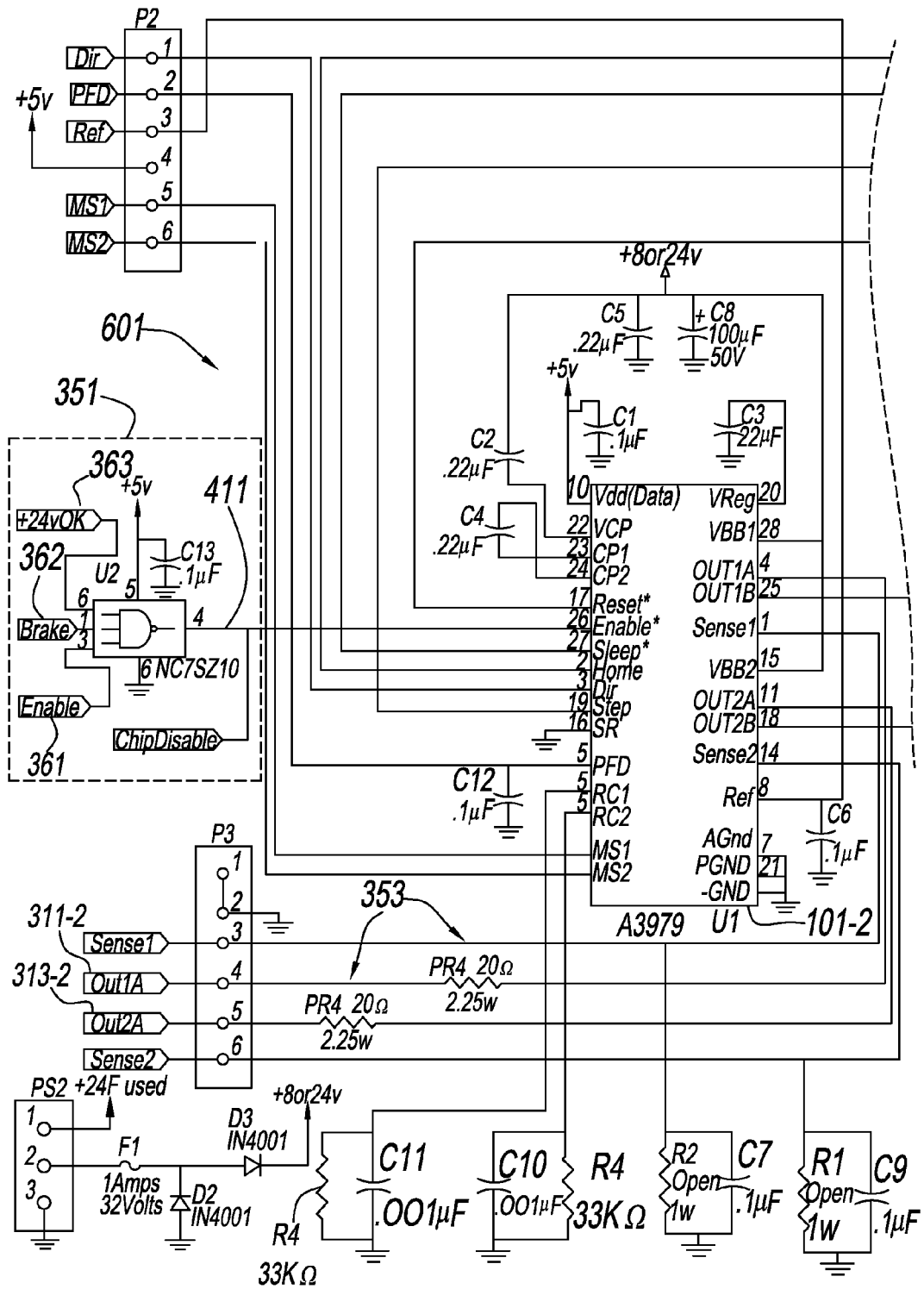
FIGS. 6 and 6A is a circuit diagram showing how the brake circuit of FIGS. 2 and 3 may

Referring to FIG. 5, driver circuit 201 in this embodiment includes an A3979 Microstepping Driver from Allegro Microsystems, Inc. as the motor controller 101-1. Brake circuit 210 likewise includes an A3979 Microstepping Driver from Allegro Microsystems, Inc. as the motor controller 101-2, as shown in FIG. 6.) Connectors 521-524 route power and control signals from the mother board to controller 101-1. The following connections are made to controller 101-1:

Dir—Controls the direction of rotation of the stepper motor shaft

PFD—Control signal for how to handle recirculating current when switching signals Ref—Control signal to limit current available to stepper motor +5 v—Logic level power supply MS1, MS2—Selects step size Home—Output signal indicating that stepper is in Home position Sleep*—Inverted control signal telling controller to sleep Enable*—Inverted control signal to enable controller's output signals Step—Control signal to step one unit Brake—Control signal calling for braking (assert braking current to stepper motor)

Reset*—Inverted control signal to reset the controller

PGND—Power ground

Sense1—Current sense voltage for motor coil 1

Out1A—Output for stepper motor coil 1 (side A)

Out2A—Output for stepper motor coil 2 (side A)

Sense2—Current sense voltage for motor coil 2

GND—Ground

VBB1, VBB2—Fused +24V output for brake circuit

Out1B—Output for stepper motor coil 1 (side B)

Out2B—Output for stepper motor coil 2 (side B)

As noted above, in a conventional arrangement without brake circuit 210, when motor controller 101 is active it limits the current output to the stepper motor coils by rapidly turning the coil outputs off and on. Rapidly turning the current off and on creates RF noise.

As shown schematically n FIG. 2, brake circuit 210 also includes a motor controller 101-2 similar to drive circuit 201. Brake circuit 210 further includes components at the inputs and outputs of controller 101-2 not present in drive circuit 201. These components, shown schematically as 250 and 253, are described more fully below with reference to FIGS. 3A, 4A, 4B and 6.

Figure 3:
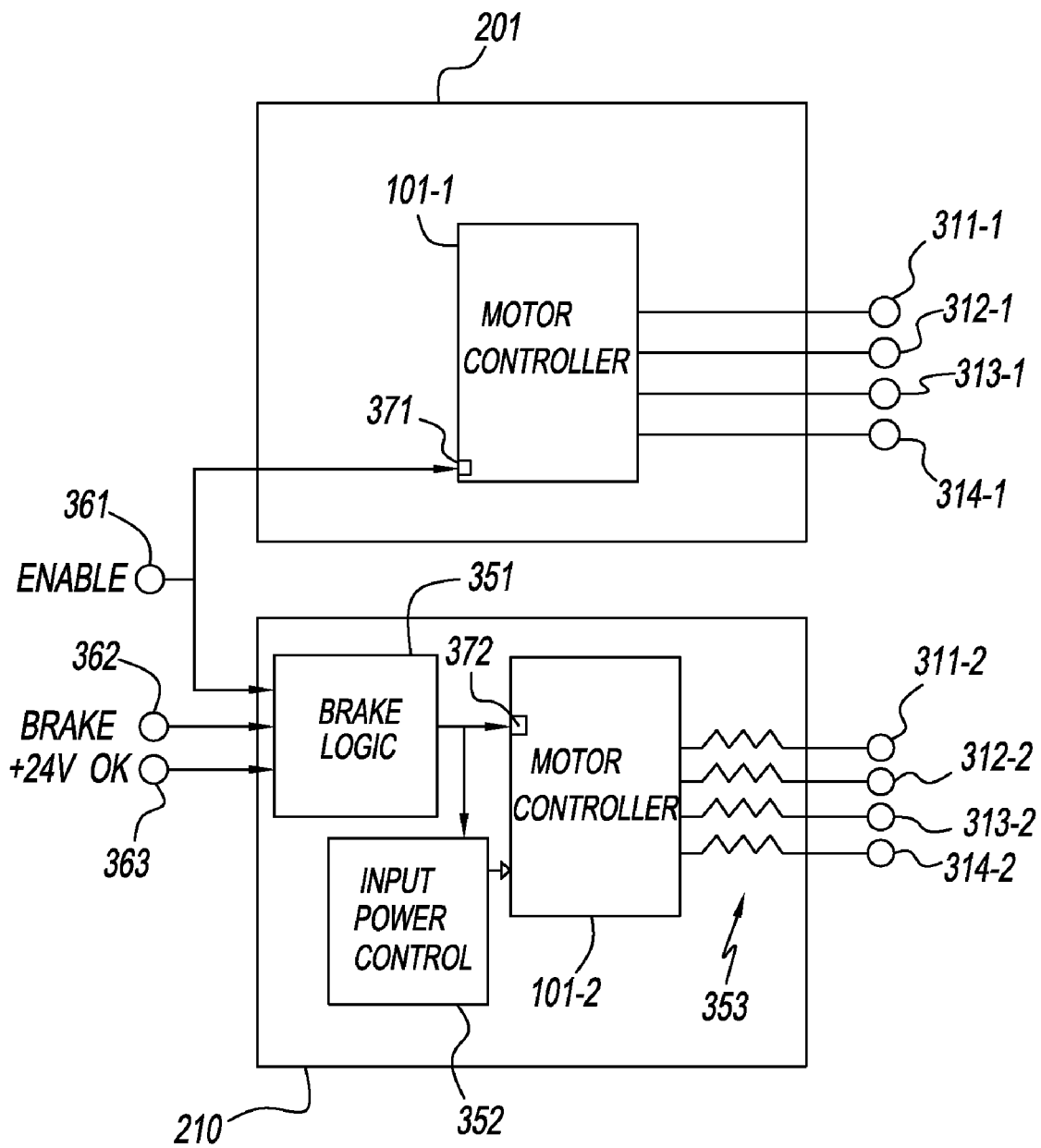
FIG. 3 schematically illustrates some details of the controller of FIG. 2, including brake logic and input power control circuits used with the motor controller in the brake unit, according to an embodiment of the disclosure.

FIG. 3 shows further details of brake circuit 210 of this embodiment, connected in parallel to driver circuit 201. The four current outputs 311-1, 312-1, 313-1, 314-1 of driver circuit 201 are each connected in parallel to the corresponding four current outputs 311-2, 312-2, 313-2, 314-2 of brake circuit 210. In brake circuit 210, power resistors 353 are in series with the motor controller 101-2 and each of the outputs 311-2, 312-2, 313-2, 314-2. The ENABLE signal 361 is delivered to both circuits. This is an inverted logic signal; that is, a logic 0 signal delivered to ENABLE terminal 371 of motor controller 101-1 enables that controller's output signals, so that the motor may advance one step. In brake circuit 210, however, signal 361 is delivered to brake logic circuit 351. The output of the brake logic circuit is delivered to the ENABLE terminal 372 of the motor controller 101-2. Braking may or may not be enabled depending on the other inputs to brake logic circuit 351.

Figures 4A, 4B:
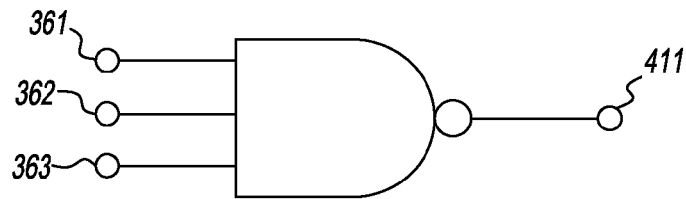
FIGS. 4A and 4B respectively illustrate an embodiment of a brake logic circuit and a logic table for the circuit, schematically illustrates a distribution map for segments of a file generated by an application on a client system, in accordance with an embodiment of the disclosure.

In this embodiment, the mother board calls for braking of the motor by sending a BRAKE signal 362 to the brake logic circuit. Brake logic circuit 351 includes a 3-input NAND gate, as shown in FIG. 4A. The third input 363 to brake logic circuit is a "+24V OK" signal indicating the status of the +24V fused power connection to motor controller 101; this signal is logic 1 in normal operation when no fuses have blown. Assuming that the +24V OK signal is logic 1 (that is, an absence of blown fuses), the output 411 of the NAND gate depends on the ENABLE and BRAKE signals as shown in the logic table of FIG. 4B, which has four rows 441-444.

Referring to FIG. 4B, since the driver ENABLE signal 361 is an inverted signal, when it is not asserted (logic level 1) the output of the driver circuit 201 is disabled (see rows 442, 444). When it is asserted (logic level 0), it enables the output of the driver circuit 201, and (due to the NAND logic of circuit 351) disables the output of the brake circuit 210 (see rows 441, 443). In order for braking current to be present at the output of circuit 210, the normal +24V must be supplied (+24V OK must be logic 1), the ENABLE signal 361 must be logic 1, and the mother board (typically a microcontroller on the mother board) must be calling for braking (BRAKE signal 362 must be logic 1), as in row 444.

When the output of brake circuit 210 is not enabled, the signal 411 is logic 1, as shown in FIG. 4B. This signal is delivered to input power control circuit 352. Signal 411 at logic 1 is used to activate transistor 653, which activates FET 654, connecting the power input (VBB) of motor controller 101-2 to +24V power (see FIG. 6). This prevents damage to the controller 101-2 when 24V signals appear on its outputs from driver circuit 201. When signal 411 is logic 0 and brake circuit 210 is active, this process is reversed; transistor 653 is deactivated, thus deactivating FET 654; and the power input to motor controller 101-2 is lowered to 8V.

Because the inputs of the two motor controllers 101-1, 101-2 are wired in parallel, their outputs track each other precisely. Accordingly, the ENABLE signal 361 selects which motor controller's outputs are active at any one time. When ENABLE is asserted (logic 0), the driver circuit's outputs are active and the stepper motor can be commanded to move. When ENABLE is deasserted (logic level 1), the brake circuit's outputs are active provided that BRAKE is also asserted (see FIG. 4B).

When ENABLE and BRAKE are both asserted, the input voltage to the motor controller chip 101-2 is lowered to 8 volts (to reduce the current available), and the stepper motor coils are driven through series resistors 353 (see FIG. 6). This limits the current to safe levels so that it is not necessary to switch the current off and on, thereby preventing RF hash. In this embodiment, a reduced voltage of 8V used because it is the minimum voltage that controller 101-2 can work with.

Figure 6A:
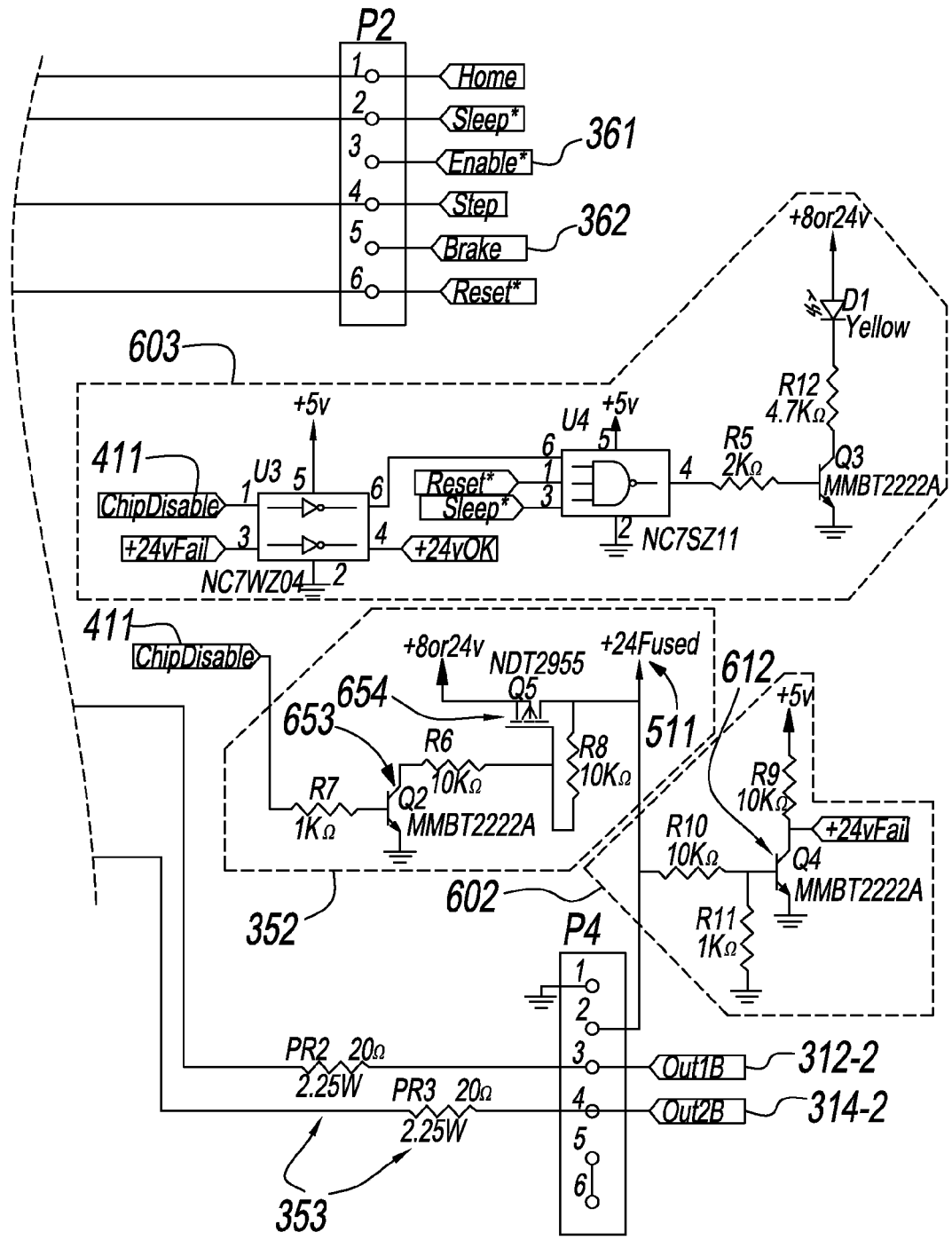

FIGS. 5, 6, and 6A are circuit diagrams showing how driver circuit 201 and brake circuit 210 may be realized. Motor controllers 101-1 and 101-2 are essentially identical A3979 Microstepping Driver devices from Allegro Microsystems, Inc. As shown in FIG. 5, driver circuit 501 includes a fuse 512 connected to +24V power source 511. The brake circuit 601 of FIG. 6 likewise has a +24V fused power source 511. Circuit 601 also includes a circuit 603 for activating an LED to indicate that braking current is being applied. Furthermore, circuit 601 includes circuit 602 which includes transistor 612. Transistor 612 is used to invert the +24V fused input 511 to a "+24V Failed" signal, which in turn prevents enabling of the outputs of the brake circuits. This serves as a safety feature, since activating the braking circuit 210 with blown fuses 512 would apply 8V signals to the outputs of the driver controller chip when there was no voltage at its power input (VBB), which would damage that chip.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

What is claimed is:

1. An apparatus for controlling a motor having a motor shaft, comprising:
   a driver circuit including
      a first motor controller device configured to receive an enabling signal and to output driver current to the motor in accordance with the enabling signal, and
      a plurality of first output connectors for connecting to the motor;
   a brake circuit including
      a brake logic circuit configured to
         receive as inputs the enabling signal, a brake input signal, and a power supply status signal, and
         output a brake logic signal,
      a second motor controller device, coupled to the brake logic circuit, configured to receive the brake logic signal output by the brake logic circuit and to output braking current to the motor in accordance with said brake logic signal,
      a plurality of second output connectors for connecting to the motor, and
      a plurality of resistors in series with the second output connectors respectively, between the second motor controller device and the second output connectors;
   wherein
   the driver circuit and the brake circuit are connected in parallel and thereby configured for a parallel connection to the motor,
   the braking circuit is effective to prevent movement of the motor shaft in accordance with output of the braking current to the motor, and
   the first motor controller device and the second motor controller device are substantially identical.

2. An apparatus according to claim 1, further comprising the motor, and wherein the motor is a stepper motor.

3. An apparatus according to claim 2, wherein the motor includes two coils each having two terminals so that the motor has four input terminals, and said parallel connection of the driver circuit and the brake circuit provides one output for each of said four inputs.

4. An apparatus according to claim 1, wherein the enabling signal is an inverted logic signal, so that the enabling signal at logic level 1 corresponds to output of the driver circuit being disabled.

5. An apparatus according to claim 4, wherein the brake logic circuit includes a 3-input NAND gate, so that the brake circuit is enabled to output the braking current to the motor in accordance with logic signals corresponding to the enabling signal, the brake input signal, and the power supply status signal being all at logic level 1.

6. An apparatus according to claim 1, further comprising a fused power supply, and wherein the power supply status signal is a logic signal so that an absence of blown fuses corresponds to said logic signal being at logic level 1.

7. An apparatus according to claim 1, wherein
   the brake circuit further comprises a power control circuit coupled to the brake logic circuit and the motor controller so that the brake logic signal is an input to the power control circuit, and
   in accordance with the brake logic signal being at logic level 1 and the braking current thus being disabled, a logic level 1 signal is delivered to the power control circuit, causing a power input of the second motor controller device to be at a first power level.

8. An apparatus according to claim 7, wherein
   in accordance with the brake logic signal being at logic level 0 and the braking current thus being enabled, a logic level 0 signal is delivered to the power control circuit, causing a power input of the second motor controller device to be at a second power level.

9. An apparatus according to claim 8, wherein the first power level corresponds to +24 volts, and the second power level corresponds to a minimum input voltage for the second motor controller device.

10. An apparatus according to claim 1, wherein the apparatus is connected to a stepper motor and is effective to control the stepper motor while avoiding generation of RF noise.

* * * * *